INVENTORS
JOHN P. WOODS
TOM PRICKETT, JR.
BY Norbert E. Birch
ATTORNEY

J. P. WOODS ET AL 2,982,371

SEISMIC EXPLORATION METHOD AND APPARATUS

Filed Sept. 2, 1954

ATTEST

Lloyd O. Heneveld

INVENTOR.
JOHN P. WOODS
TOM PRICKETT, JR
BY
Norbert E. Birch

ATTORNEY

ATTEST
Lloyd A. Heneveld

INVENTORS
JOHN P. WOODS
TOM PRICKETT, JR
BY Norbert E. Birch
ATTORNEY

United States Patent Office 2,982,371
Patented May 2, 1961

2,982,371

SEISMIC EXPLORATION METHOD AND APPARATUS

John P. Woods and Tom Prickett, Jr., Dallas, Tex., assignors to The Atlantic Refining Company, Philadelphia, Pa., a corporation of Pennsylvania Filed Sept. 2, 1954, Ser. No. 453,853

17 Claims. (Cl. 181—.5)

This invention relates to a method and apparatus for obtaining geophysical measurements and more particularly to a method and apparatus for obtaining such measurements by means of variable frequency seismic waves.

In obtaining geophysical measurements today, it is conventional to place an explosive charge such as dynamite in a shot hole and thereafter to detonate the charge creating seismic waves and in the earth which propagate to the lower strata of the earth. These waves are received at remote points from the explosive charge and reproduced into electrical signals which are recorded on seismic charts to give very valuable information regarding the properties of the earth.

In one of these operations, commonly referred to as seismic prospecting, the shot holes have to be drilled by a crew called the "drillers." Thereafter, so-called "shooters" bury an explosive charge and detonate it while observers place the geophones and obtain the records on the seismic charts. In a seismic prospecting operation the seismic waves created near the surface of the ground travel to the reflecting layers beneath the surface of the earth from which the waves are reflected. These reflected waves are received at certain spaced points on the surface of the earth for the purpose of determining the depth of the reflecting layers.

In another operation, commonly referred to as seismic well logging, the velocities of seismic waves through various strata under the earth are obtained by placing a geophone in a well and detonating an explosive charge near the surface. The geophone picks up the seismic wave generated by the charge and the time interval between the sending and receiving of the wave is recorded for determining the velocity of the wave through the given depth of the strata.

As stated previously, both of these operations are very costly. Furthermore, these operations have many disadvantages in that the explosion of the charges is always a danger to the "shooters" and the records obtained are very difficult to interpret. In view of these disadvantages, it has been proposed that various other seismic wave sources be utilized. Among these proposals has been the use of a variable frequency seismic wave created by a mechanical vibrator, such as rotating flywheels which impart a force to the ground upon which they are placed.

Although the use of a variable frequency seismic wave source has been under consideration for a number of years, such a wave source has not been used to any extent nor has it been deemed to be feasible by the oil industry. This has been due to the fact that the intensity of the varying frequency waves, hereinafter referred to as the useful seismic wave, which it has been possible to create is too weak and attenuates to such an extent that the random waves having frequencies different from the generated waves and which are created in the earth as by ocean waves, changes in temperature, wind, and movement of the objects on the earth, etc., commonly referred to as "noise," have drowned out or masked the effect produced by the useful seismic wave on the geophones. It has been realized that these useful seismic waves at a particular instant may be at a different frequency from the frequency of the noise, but heretofore no satisfactory method or apparatus has been invented which can separate that portion of the received signal representing the useful seismic wave from the portion of the signal representing the noise.

It is therefore an object of this invention to provide an improved method and apparatus for distinguishing and measuring the useful seismic wave produced in the earth by a cyclic varying frequency wave source.

A further object of this invention is to provide an improved method and apparatus for seismic prospecting wherein a cyclic varying frequency wave is created in the earth and the useful waves reflected from the reflecting surfaces beneath the surface of the earth are separated from the noise produced in the ground and recorded for determining the travel time of such useful waves.

A further object of this invention is to provide an improved method and apparatus for seismic well logging, wherein a cyclic varying frequency wave is created in the earth and picked up by a geophone in a borehole such that the useful waves are separated from the noise produced in the ground and are recorded for determining the velocity of such useful waves through the formations which the borehole traversed.

The general arrangements and the other objects of our invention may be more readily determined by referring to the drawings wherein.

Figure 1:
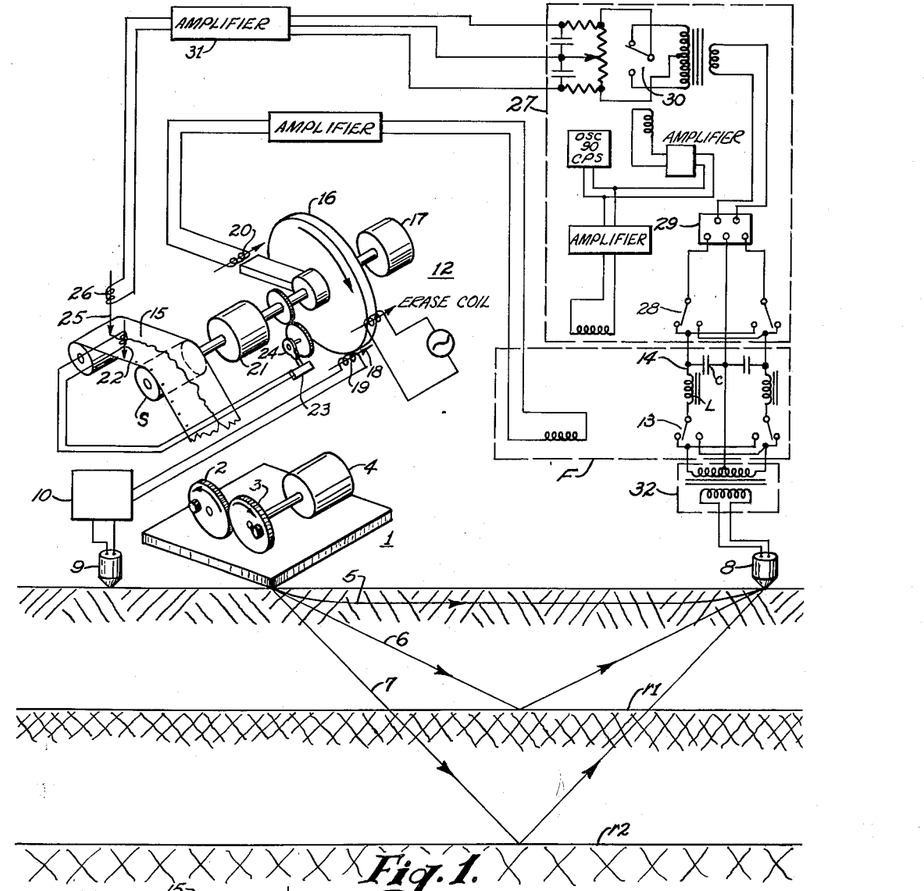
Figure 1 discloses one arrangement of our apparatus for use in seismic prospecting.

Referring specifically to Figure 1, there is disclosed a conventional frequency modulated generator 1 which comprises two flywheels 2 and 3 which are geared to each other and driven by motor 4 so that they will impart to the ground a force which will generate in the earth continuous cyclic varying frequency waves. The seismic waves produced by generator 1 follow various paths, for example, as shown at 5, 6, and 7. It is evident that the shortest path of the seismic wave to the geophone 8, spaced remotely from the generator, is the path of the refracted wave denoted by reference numeral 5. Reference numerals 6 and 7 denote paths of reflected waves from the reflecting surfaces $r_1$ and $r_2$, respectively. It is important in the operation of this invention that the periodicity of the frequency modulated wave be equal to or greater than the travel time of the deepest reflection to be studied. For example, if the reflection layer $r_2$ was the deepest reflection to be investigated the periodicity of the generated frequency modulated wave sent out from generator 1 should be at least as great as the expected travel time for the wave that follows path 7.

As stated previously, the waves generated by generator 1 and following paths 5, 6, and 7 are received by geophone 8, which also simultaneously picks up waves caused by other random sources, such waves being previously referred to as noises. The waves picked up by geophone 8 are transformed into electrical signals which are measured for determining the depth of the various reflecting surfaces, as will be more fully described hereinafter. Figure 1 pertains to apparatus and methods for separating and recording the electrical signals representing the useful seismic waves, for example, those following paths 6 and 7.

In Figure 1 the waves produced in the earth by generator 1 are also simultaneously picked up by geophone 9, located immediately adjacent generator 1. The signal from geophone 9 representing the waves is amplified by means of amplifier 10 and continuously impressed upon time delay unit 12 which continuously time delays the signal picked up by geophone 9, as will be set forth more specifically hereinafter. The continuous time delayed signal produced by unit 12 is utilized to separate the electrical signal representing the useful waves from the electrical signal representing the noise, both of which waves are picked up by geophone 8. This is accomplished by means of a filtering unit F which comprises a synchronous relay 13 and a low pass narrow band filter 14. The time delayed signal from time delay unit 12 continuously varies the frequency of the operation of relay 13 by means of a coil in a well known manner, so that only when a frequency equal to the frequency of the incoming signal representing the useful seismic waves is impressed upon relay 13, the incoming signal is converted to a low frequency signal which is passed to filter 14. Filter 14, being a low pass narrow band filter comprising inductances L and condensers C, filters out the part of the signal having high frequencies which include the part of the signal representing the noise, and it passes that part of the signal having a low frequency which includes the part representing the useful wave. Thus the part of the signal representing the useful wave which has the same frequency as the time delayed signal is passed through filter 14 and recorded on record chart 15. Accordingly, in order for filter unit F to pass an incoming signal representing a useful seismic wave, the time delay of the time delayed signal has to be equal to the travel time of the generated seismic wave from the generator to the geophone 8. It will thus be evident that when a signal is passed through the filter 14 and recorded on the chart 15 in a manner hereinafter described, correlation of the instantaneous time delay of the signal from time delay unit 12 with the inflections caused by the useful signal on record chart 15 will give the travel time of the useful seismic wave from the generator to the geophone 8.

Referring more specifically to time delay unit 12, it will be apparent that the apparatus included therein is adapted to vary the time delay of the signal from geophone 9 at a very slow rate so that the resultant time delayed signal can control a filter which separates from the noise the useful portion of a seismic signal picked up by geophone 8. This is accomplished by continuously time-delaying the signal from geophone 9 by means of a rotating magnetically coated drum 16 upon which a signal is impressed at the start of each revolution. Once each revolution of drum 16 the impressed signal is picked up by rotating pickup head 20. With this arrangement, the angular displacement of pickup head denotes the time delay of the signal picked up. This object is accomplished by impressing the signal from amplifier 10 on drum 16 by means of stylus 18 actuated by coil 19 and picking up the time delayed signal once every revolution of drum 16 by means of pickup head 20 which slowly scans the drum 16. The erase coil shown erases the signal from the drum just previous to the start of each rotation thereof. Therefore, it is seen that as drum 16 rotates the pickup head 20 rotates and once every revolution of drum 16 the time delayed signal will be picked up by pickup head 20, the position of the pickup head at the time of such pickup indicating the time delay of the signal picked up.

It is important in the operation of the apparatus and in practicing the method of this invention, that drum 16 and pickup head 20 be rotated at certain predetermined rates in order that the filter F can be operated effectively and the desired reflected wave can be detected. The time for each revolution of drum 16 should always be equal to or greater than twice the travel time to the deepest depth to be examined in order to measure a time delay equal to such travel time. For example, in Figure 1 where the reflecting surface $r_2$ is being investigated, the time for one rotation of drum 16 should be at least as great or greater than the estimated time it takes for the wave generated from generator 1 to travel to geophone 8 via path 7. In other words the time for one revolution of drum 16 should substantially correspond with the periodicity of the frequency modulated wave generated by generator 1.

It has been found that pickup head 20 which is rotated by motor 21 has to be rotated at a much slower rate than drum 16 in order to allow the narrow band filter unit to operate properly. With the particular filter unit F shown in Figure 1 it has been found that the speed of rotation of pickup head 20 has to be on the order of 30 minutes per revolution in contrast with a three-second revolution for drum 16. In any event, it should be understood that the rate of rotation of pickup head 20 can be any speed which will allow the condensers of the filter 14 to build up and maintain the desired frequency band.

Time delay unit 12 also comprises means for marking on the chart the angular displacement of pickup head 20, in other words the time delay of the signal picked up by pickup head 20. This angular displacement in the apparatus shown is indicated by time, that is the true time delay of the signal as contrasted with running time of pickup head 20. It should be understood, in this specific example, that although the pickup head rotates every thirty minutes, the time delay represented by the angular displacement of the pickup head is always less than three seconds. Accordingly, the time marks made on the chart to indicate the angular displacement of pickup head 20 should represent time interval less than three seconds. In the apparatus shown, this marking is accomplished by driving chart spool S by means of motor 21 and actuating time marker 22 by means of a microswitch 23 which in turn is actuated by cam 24 geared to the shaft of motor 21. Cam 24 is geared at a high ratio to motor 21 so that it rotates at a higher rate than the pickup head 20, this rate depending upon the time interval desired between each mark and the relative rates of rotation of drum 16 and pickup head 20. For example, if the time interval between each mark is to represent .01 second and drum 16 and pickup head 20 each rotates once every three seconds and thirty minutes, respectively, the cam 24 should rotate once every six seconds. It should be understood that equivalent arrangements of recording equipment for correlating the time delay with the recorded signal can be used without departing from the scope of this invention.

Referring now to the means for recording the low frequency signal passed through filter unit F and representing the useful seismic signal, it is evident from Figure 1 that the signal has to be amplified many times in order to drive the recording pen 25 by means of coil 26. This can be accomplished by a direct coupled amplifier or by use of a chopper-type amplifier. Figure 1 shows a chopper-type amplifier 27 comprising a synchronous relay 28, actuated in a well known manner by the elements shown, which converts the low frequency output of filter 14 to a fixed A.C. frequency, in this case 90 c.p.s. This A.C. signal is then amplified by a narrow band A.C. amplifier 29 and thereafter reconverted to a D.C. signal by means of synchronous relay 30 which is also actuated in a well known manner by the elements shown. High gain D.C. amplifier 31 then amplifies the D.C. signal from relay 30 and the amplified signal from amplifier 31 drives the recording pen 25 by means of coil 26.

One important aspect of this invention is the arrangement of relay 13, filter 14, and amplifiers 27 and 31 in respect to the geophone 8. We have discovered that the arrangement shown in Figure 1 plays an important part in the behavior of the system in that unexpected results are obtained by filtering out the signal representing the noise before amplifying the signal produced by geophone 8. In accordance with this invention the signal produced by geophone 8 is stepped up by step up transformer 32 by a factor of between 50 to 100. Thereafter, relay 13, controlled by the time delayed signal from unit 12, converts the part of the signal from transformer 32 representing the useful wave, into a low frequency signal. This low frequency signal representing the useful seismic waves is thereafter amplified by means of amplifiers 27 and 31 by a factor of about 10,000. With this arrangement a receiver is provided which is always responsive to the useful seismic wave and non-responsive to noise in that the signal representing the noise is filtered out before any substantial amplification. Furthermore, with the arrangement described above the strong signals from the noise are never strong enough to overload the amplifier since the noise is filtered out before amplification other than by transformer 32.

Briefly describing the operation of the apparatus shown in Figure 1, a continuously varying cyclic seismic wave is generated in the earth by means of the generator unit 1. These seismic waves, after being reflected by the various reflecting surfaces beneath the surface of the earth, are picked up by geophone 8 along with the accompanying noise produced from extraneous sources. Geophone 8 transforms the seismic waves and the noises into electric signals which are amplified by the step up transformer 32. The signal from step up transformer 32, including the signal representing the useful seismic wave signal and the signal representing the noise, is impressed on the relay 13. The frequency of relay 13 is controlled by the time delayed signal produced by geophone 9 and time delay unit 12 which is set into operation immediately after generating waves in the ground. As pickup head 20 rotates and picks up the time delayed signal from geophone 9, it eventually reaches a position where the time delay of the signal it picks up is equal to the travel time of a useful seismic wave picked up by geophone 8. At this point of coincidence relay 13, which is continuously actuated by the time delayed signal, converts the frequency modulated signal representing such useful wave into a low frequency signal. This low frequency signal is passed through low pass narrow band filter 14 and then amplified by means of the amplifier units 27 and 31, and thereafter used to drive recording pen 25 and mark an inflection on record chart 15 which indicates the passing of a useful signal through filter unit F. In the meanwhile, the time delay of pickup head 20 is indicated on the chart 15 by means of the time delay marks produced by cam 24, microswitch 23, and marker 22. Accordingly, a record is obtained by which the indication of a useful signal can be correlated with respect to the time delay of the time delayed signal which controlled the passing of the useful signals through the low pass narrow band filter. Since the filter unit F only passes a signal representing a useful seismic wave when the time delay of pickup head 20 is equal to the travel time of such useful wave, the determination of the time delay of the time delayed signal controlling filter F at the given instant when a signal is passed by filter F, denotes the travel time of the useful seismic wave represented by the recorded signal.

Figure 4:
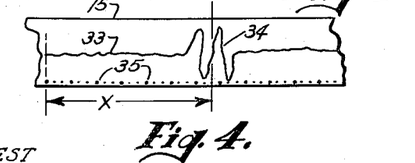

Figure 4 shows an example of a record obtained by the use of the apparatus of Figure 1. Chart 15 is shown with a trace 33 produced by recording pen 25. Trace 33 has an inflection 34 caused by a signal representing a useful seismic wave. Chart 15 also shows the travel time marks 35 produced by marker 22 in the manner previously described. The particular curve shown in Figure 4 obtains its characteristic shape as a result of relay 13 and filter 14 performing the mathematical functions of multiplication and integration respectively on the electrical signals transmitted to these units. In relay 13, the electrical signal corresponding to the sonic signal received by geophone 9 is converted to a square wave of amplitude 1 having the same repetitive frequency as the original signal from geophone 9, and the resultant square wave signal is multiplied by the electrical signal corresponding to the sonic signal received by geophone 9. If the constants of filter circuit 14 are such that $$L\frac{di}{dt} \gg \frac{1}{C_0}\int^T i\, dt$$

where:

$i$=current
$t$=instantaneous time
$L$=inductance
$C$=capacitance, filter 14 operates on the product signal from relay 13 to produce a signal which is a double integral of the product signal and has the particular inflection of trace 33 of Figure 4. It should be apparent from chart 15 in Figure 4 that at the instant of the recording of an inflection such at shown at 34 the time relay of the signal controlling the passing of the signal which caused inflection 34 was X seconds. Accordingly, by counting the time delay markers 35 each of which represents a 1/100 of a second, the time delay of pickup head 20 is determined as being .200 second and consequently the travel time of the useful wave represented by the signal causing inflection 34 is .200 second. Knowing the travel time of the wave and the velocities of the wave through the strata to the reflecting layer under investigation the depth of the reflecting layer can then be determined.

Figure 2:
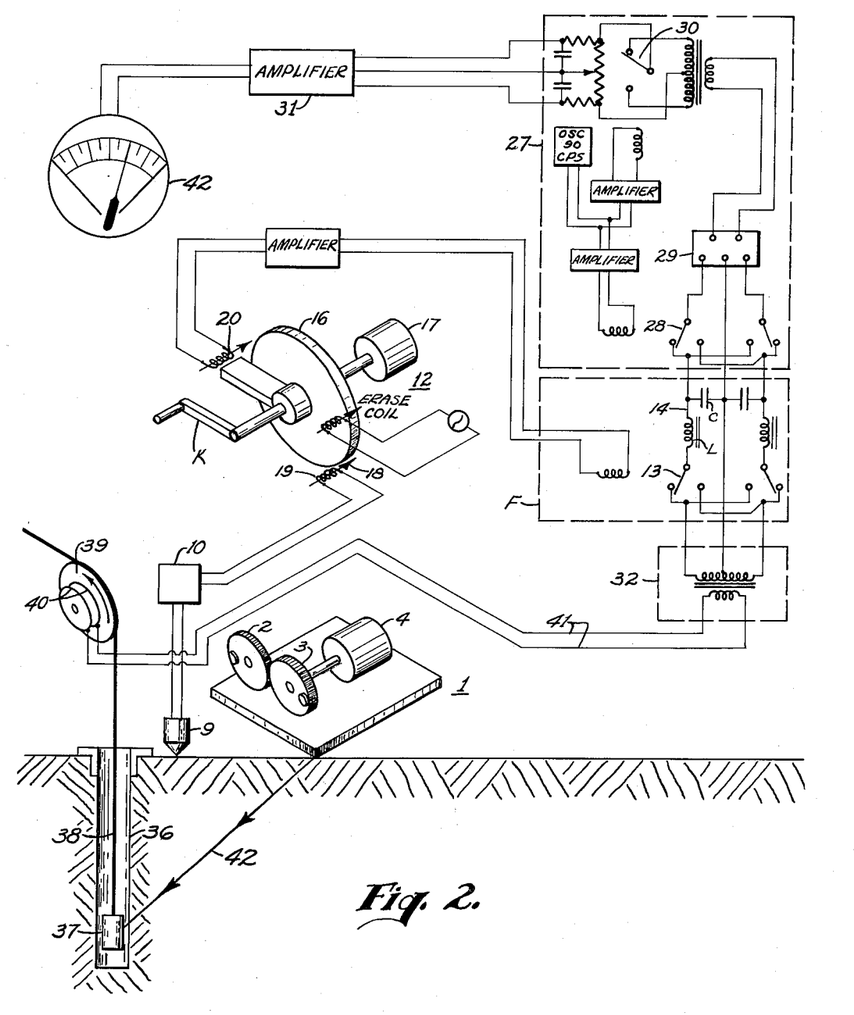
Figure 2 shows an arrangement of our apparatus which is similar to that of Figure 1 which is adapted for use in seismic well logging.

Figure 2 discloses a method and apparatus for determining the velocities of a wave through formations below the surface of the earth with apparatus similar to that shown in Figure 1. Figure 2 shows a borehole 36 in which a geophone 37 has been lowered by means of a cable 38 and reel 39. Generator 1 is shown located closely adjacent borehole 36. Geophone 37 is electrically connected to filter unit F by means of conductors, not shown, in cable 38, slip rings 40, conductors 41 and step up transformer 32. The apparatus of Figure 2 operates similar to that of Figure 1 except that geophone 37 picks up the variable frequency seismic wave generated by generator 1 and the pickup head is operated manually by means of crank K to determine the point of coincidence where the time delay is equal to the travel time of a useful wave. In the operation of the apparatus of Figure 2 geophone 37 is raised and lowered to different depths by means of reel 39 so that the travel times of the seismic waves from the surface to the different known depths can be determined. For each depth the operator adjusts pickup head 20 by means of crank K until a signal passing through filter F gives an indication on meter 42. Then the time delay of pickup head 20 indicated by the position thereof is observed and marked on a chart along with the depth. Therefore, a travel time versus depth chart can be obtained which is very useful in determining depths of various reflecting layers in preparing geological maps from seismic prospecting data.

Figures 3, 5:
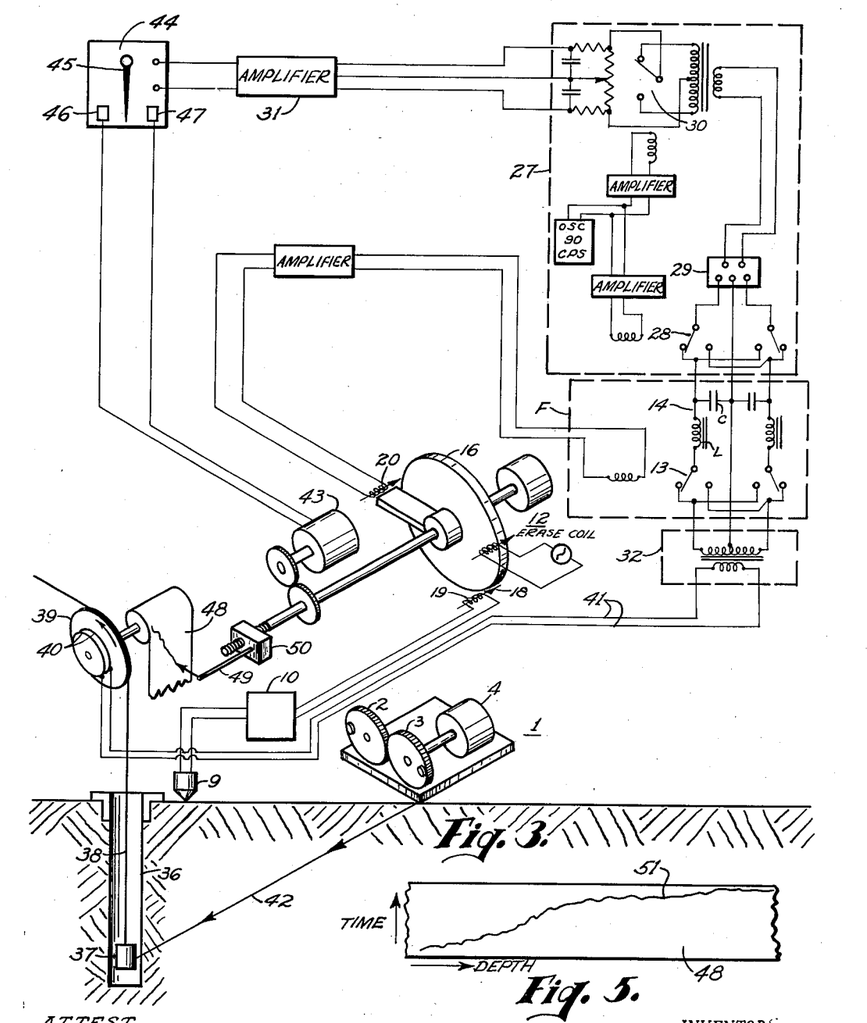
Figure 3 shows still another embodiment of this invention which is especially adapted for use in seismic well logging.
Figures 4 and 5 disclose seismic charts which would be obtained with the apparatus of Figures 1 and 3, respectively.

Figure 3 shows a modification of the method and apparatus shown in Figure 2. With the apparatus of Figure 3 a travel time versus depth chart can automatically be obtained. Figure 3 in the same manner as Figure 2 shows borehole 36 having a geophone 37 lowered therein by means of cable 38 and reel 39. Generator 1 is located closely adjacent borehole 36 and generates cyclic variable frequency waves in the earth. These waves are received by geophone 37, transformed into electrical signals, and impressed on step up transformer 32 by means of conductors in cable 39, slip rings 40, and conductors 41. Simultaneously with the generation of the waves, geophone 9 transforms the waves into an electrical signal which is amplified by amplifier 10 and impressed on the magnetically coated drum 16 of delay unit 12 by means of record coil 19 and stylus 18. This signal is picked up by pickup head 20 and time delayed by a time depending upon the position of pickup head 20. In this particular modification of Figure 3 the position of pickup head 20 is controlled by the signal passed by filter F. In other words, a feedback network is formed wherein the time delayed signal from geophone 9 controls the signal passed by filter unit F and in return the signal passed by filter unit F controls the time delay of the signal from geophone 9. This may be accomplished by motor 43 and switching unit 44. Motor 43 is a conventional servo-motor which rotates in two directions depending upon the position of switching element 45 of unit 44. When element 45 contacts contact 46 the motor rotates in one direction and when element 46 contacts contact 47 the motor rotates in the other direction and when neither of the contacts are contacted by element 46 the motor does not rotate. The position of switching element 45 is controlled by the signal from high gain D.C. amplifier 31 such signal being shown in Figure 4 at 34. It is apparent that the signal representing the useful wave causes element 45 to oscillate back and forth causing motor 43 to hunt eventually locking the pickup head 20 into a position where the time delay of the signal controlling filter F is always equal to the travel time of the useful waves from generator 1 to geophone 37 via the direct path 42. Accordingly, as geophone 37 is slowly raised or lowered the position of pickup head 20 will change to correspond with the travel time of the useful waves. This travel time is recorded on chart 48, which is driven in synchronism with reel 39, by means of stylus 49 whose position is controlled by the position of pickup head 20 in any well known manner such as by the screw arrangement shown at 50. Thus, a record showing travel time versus depth is automatically obtained. An example of this record is shown in Figure 5 where the trace 51 shows depth longitudinally on the chart and travel time transversely on the chart. It should be evident that with the use of this chart the travel time at any specific depth can be determined and vice versa.

Figure 6:
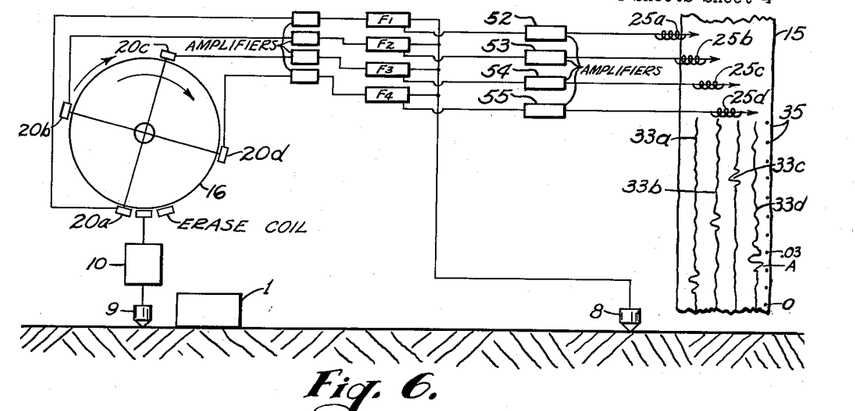
Figures 6 and 7 show modifications of the apparatus of Figure 1.
Figure 7:
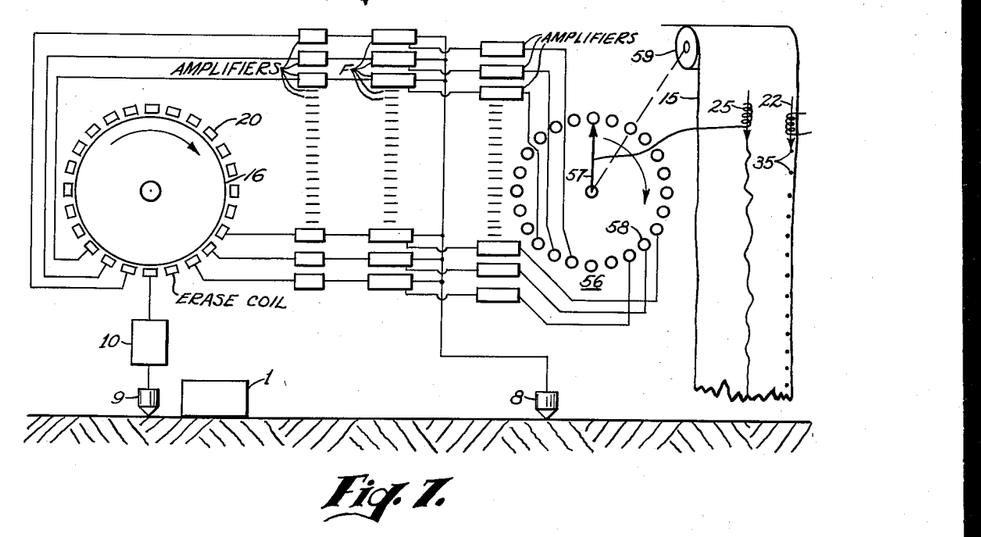

As previously disclosed in respect to the apparatus of Figure 1, the pickup head 20 rotates at a relatively slow rate when compared to the rotation of drum 16. In the example given drum 16 rotates once every three seconds while pickup head 20 rotates once every 30 minutes. This slow rotation of pickup head 20 is necessary in the apparatus shown in Figure 1 because of the narrow band filter 14 which requires time for the condensers C to build up. Therefore, pickup head 20 has to scan drum 16 at a very slow rate which makes the operation of the apparatus of Figure 1 considerably slower than desired. Figures 6 and 7 show apparatus for speeding up these operations.

In Figure 6 there is schematically illustrated apparatus for scanning the entire drum in less time than that required by the apparatus of Figure 1. In accordance with the apparatus of Figure 6, there are provided four pickup heads 20a, 20b, 20c, and 20d, each of which rotates and scans one-quarter of the drum 16. Each of the pickup heads 20a, 20b, 20c, and 20d is connected to filter units F1, F2, F3, and F4, respectively, and control such filters in the manner previously described in connection with Figure 1. The signals from filter units F1, F2, F3, and F4 are amplified by amplifier units designated at 52, 53, 54, and 55 and thereafter impressed on the record pens 25a, 25b, 25c, and 25d, respectively, to simultaneously record on chart 15. Accordingly, the apparatus of Figure 6 operates very similarly to that of Figure 1 except that is can be operated at one fourth of the operating time of the apparatus of Figure 1. The record obtained is shown on record chart 15 and comprises the traces 33a, 33b, 33c, and 33d. It should be understood that inflections in these traces when correlated with the time delay marks 35 represent different time delays for each trace. Therefore the record produced by record pen 25a represents the time delay between zero and the time for one-quarter revolution of drum 16 while record pen 25b produces a record which covers the time delay interval between the time beginning and ending with the second quarter revolution of drum 16. For example, if drum 16 rotates every three seconds and an inflection is shown on trace 33d at a time delay equal to .03 second, such as shown at A, the travel time of the useful wave represented by such inflection would be 2.25+.03 or 2.28 seconds.

Figure 7 shows another modification for shortening the operating time of the apparatus of Figure 1. In Figure 7 a plurality of stationary pickup heads 20 are fixedly spaced around the rotating drum 16. Each of these heads is electrically connected to its own filter unit F and controls the band thereof in the manner previously referred to in the description of Figures 1 and 6. A switch 56 is provided which moves very slowly and sequentially connects each of the filter units F to the recording pen 25 which records on chart 15 the signal passed by the respective filter unit F. Contactor 57 of switch 56 moves in synchronism with the driving spool 59 of the recording mechanism so that the signal from filter units F are recorded on different portions of the chart. In this modification timing marker 22 is also controlled by switching unit 56 so that as contactor 57 contacts each of the contact points 58 a mark is made on chart 15 indicating the time delay intervals represented by the spacing of pickup heads 20. This is accomplished, for example, by making the spacings between contact points 58 proportional to the spacings between pickup heads 20 and providing a circuit, not shown, which will cause actuation of time delay marker 22 each time contactor 57 contacts one of the contact points 58.

Numerous other modifications can be made in accordance with the spirit of this invention. Therefore it should be understood that while this invention has been described in connection with a preferred method and apparatus, this invention is not limited to the specifically disclosed method and apparatus but is only limited in accordance with the appended claims.

We claim:

1. The method of obtaining geophysical measurements comprising the steps of generating in the earth useful seismic waves of cyclically varying frequency, receiving by means of a receiver said useful waves and noise accompanying said waves at a location remote from the source of said generated waves after a time interval later than the time when said waves were generated, said time interval being equal to the travel time of said useful seismic waves to the receiver, transforming said waves and noise received by said receiver into a first electrical signal, producing a second electrical signal having a frequency in respect to time substantially in phase with the varying frequency of said generated useful seismic waves, time delaying said second electrical signal, filtering said first signal by means of a narrow band filter in order to separate the portion of the signal representing the useful seismic wave from the portion of the signal representing said noise, controlling the frequency band of said filter by means of said time delayed second signal, and thereafter measuring the amplitude of said first signal passed by said filter simultaneously with the time delay of said second time delayed signal to determine the travel time of said wave to said receiver.

2. A method of geophysical prospecting which comprises generating in the earth at a first point near the surface of the earth a seismic wave of cyclically varying frequency, receiving at a second point near the surface of the earth remote from said first point said wave reflected from a reflecting layer beneath the surface of the earth and also the noise accompanying said waves, the said waves being received after a time interval later than the time when said waves were generated, said time interval being equal to the travel time of said seismic waves from said first point to said reflecting layer to said second point, producing a second electrical signal having a frequency in respect to time substantially in phase with the varying frequency of said generated seismic waves, time delaying said second electric signal, filtering said first signal by means of a narrow band filter in order to separate the portion of the signal representing the useful seismic wave from the portion of the signal representing said noise, controlling the frequency band of said filter by means of said time delayed second signal, and thereafter measuring the amplitude of the first signal passed by said filter simultaneously with the time delay of said second time delayed signal to determine the travel time of said wave to said receiver.

3. A method for determining the velocities of a wave through formations traversed by a borehole comprising the steps of lowering into the borehole a geophone, generating in the earth adjacent to said borehole useful seismic waves of cyclically varying frequency, receiving by means of said geophone said useful waves and noise accompanying said waves after a time interval later than the time when said waves were generated, said time interval being equal to the travel time of said useful seismic waves to the geophone, transforming said waves and noise received by said geophone into a first electrical signal, producing a second electrical signal having a frequency in respect to time substantially in phase with the varying frequency of said generated useful seismic waves, time delaying said second electrical signal, filtering said first signal by means of a narrow band filter in order to separate the portion of the signal representing the useful seismic wave from the portion of the signal representing said noise, controlling the frequency band of said filter by means of said time delayed second signal, and thereafter measuring the amplitude of the first signal passed by said filter simultaneously with the time delay of said second time delayed signal to determine the travel time of said wave to said geophone.

4. A method for determining the velocities of seismic waves in formations traversed by a borehole comprising the steps of lowering into the borehole a geophone, generating in the earth useful seismic waves of cyclically varying frequency, receiving by means of said geophone the useful waves and noise acompanying said waves after a time interval later than the time when said waves were generated, said time interval being equal to the travel time of said useful seismic waves to the receiver, transforming said waves and noise received by said geophone into a first electrical signal, producing a second electrical signal having a frequency in respect to time substantially in phase with the varying frequency of said generated useful seismic waves, time delaying said second electrical signal by means of a time delay unit, filtering said first signal by means of a narrow band filter in order to separate the portion of the signal representing the useful seismic wave from the portion of the signal representing said noise, controlling the frequency band of said filter by means of said time delayed second signal, controlling the time delay of said time delayed second signal by means of feeding back the portion of said first signal passed by said filter to said time delay unit, and recording the time delay of said second time delayed signal in respect to the depth of said geophone in said borehole while varying the depth of said geophone.

5. The method of obtaining geophysical measurements comprising the steps of generating in the earth seismic waves of cyclically varying frequency, receiving by means of a receiver said waves and noise accompanying said waves at a location remote from the source of said generated waves after a time interval later than the time when said waves were generated, said time interval being equal to the travel time of said seismic waves to the receiver, transforming said waves and noise received by said receiver into a first electrical signal, producing a second electrical signal having a frequency in respect to time substantially in phase with the varying frequency of said generated seismic waves, time delaying said second electrical signal, converting by means of said time delayed second signal that portion of said first signal representative of the useful waves received by said receiver into a low frequency signal, passing said low frequency signal through a low pass narrow band filter and thereafter measuring the amplitude of said low frequency signal simultaneously with the time delay of said second time delayed signal to obtain the travel time of said wave to said receiver.

6. The method of obtaining geophysical measurements comprising the steps of generating in the earth seismic waves of cyclically varying frequency, receiving by means of a receiver said waves and noise accompanying said waves at a location remote from the source of said generated waves after a time interval later than the time when said waves were generated, said time interval being equal to the travel time of said seismic waves to the receiver, transforming said waves and noise received by said receiver into a first electrical signal, producing a second electrical signal having a frequency in respect to time substantially in phase with the varying frequency of said generated seismic waves, time delaying said second electrical signal, impressing said first electrical signal on a relay, controlling the frequency of vibration of said relay by means of said time delayed second signal whereby that portion of first said signal representative of the useful waves received by said receiver is converted into a low frequency signal when the time delay of said time delayed signal is equal to the travel time of said useful wave, passing said low frequency signal through a low pass narrow band filter, and thereafter measuring the amplitude of said low frequency signal simultaneously with the time delay of said second time delayed signal to obtain the travel time of said wave to said receiver.

7. A method of geophysical prospecting which comprises generating in the earth at a first point near the surface of the earth a seismic wave of cyclically varying frequency, receiving at a second point near the surface of the earth remote from said first point said wave reflected from a reflecting layer beneath the surface of the earth and also the noise accompanying said waves, the said waves being received after a time interval later than the time when said waves were generated, said time interval being equal to the travel time of said seismic waves from said first point to said reflecting layer to said second point, producing a second electrical signal having a frequency in respect to time substantially in phase with the varying frequency of said generated seismic waves, time delaying said second electrical signal, impressing said first electrical signal on a relay, controlling the frequency of vibration of said relay by means of said time delayed second signal whereby that portion of said first signal representative of the useful waves received by said receiver is converted into a low frequency signal when the time delay of said time delayed signal is equal to the travel time of said useful wave, passing said low frequency signal through a low pass narrow band filter, and thereafter measuring the amplitude of said low frequency signal simultaneously with the time delay of said second time delayed signal to obtain the travel time of said wave to said receiver.

8. A method for determining the velocities of a seismic wave through formations traversed by a borehole comprising the steps of lowering into the borehole a geophone, generating in the earth adjacent to said borehole useful seismic waves of cyclically varying frequency, receiving by means of said geophone said useful waves and noise accompanying said waves after a time interval later than the time when said waves were generated, said time interval being equal to the travel time of said useful seismic waves to the geophone, transforming said waves and noise received by said geophone into a first electrical signal, producing a second electrical signal having a frequency in respect to time substantially in phase with the varying frequency of said generated seismic waves, time delaying said second electrical signal, impressing said first electrical signal on a relay, controlling the frequency of vibration of said relay by means of said time delayed second signal whereby that portion of said first signal representative of the useful waves received by said receiver is converted into a low frequency signal when the time delay of said time delayed signal is equal to the travel time of said useful wave, passing said low frequency signal through a low pass narrow band filter, and thereafter measuring the amplitude of said low frequency signal simultaneously with the time delay of said second time delayed signal to obtain the travel time of said wave to said receiver.

9. A method for determining the velocities of a seismic wave through formations traversed by a borehole comprising the steps of lowering into the borehole a geophone, generating in the earth adjacent to said borehole useful seismic waves of cyclically varying frequency, receiving by means of said geophone said useful waves and noise accompanying said waves after a time interval later than the time when said waves were generated, said time interval being equal to the travel time of said useful seismic waves to the geophone, transforming said waves and noise received by said geophone into a first electrical signal, producing a second electrical signal having a frequency in respect to time substantially in phase with the varying frequency of said generated seismic waves, time delaying said second electrical signal, impressing said first electrical signal on a relay, controlling the frequency of vibration of said relay by means of said time delayed second signal whereby that portion of said first signal representative of the useful waves received by said receiver is converted into a low frequency signal when the time delay of said time delayed signal is equal to the travel time of said useful wave, passing said low frequency signal through a low pass narrow band filter, controlling the time delay of said time delayed second signal by means of feeding back a portion of said first signal passed by said filter to said time delay unit, and continuously recording the time delay of said second time delayed signal in respect to the depth of said geophone while varying the depth of said geophone.

10. In apparatus for obtaining geophysical measurements comprising means for generating in the earth useful seismic waves of cyclically varying frequency, receiving means located at a place remote from the source of said generated waves for receiving said useful waves and noise accompanying said waves, and for transforming said useful waves and noise into a first electrical signal, and measuring means for measuring the amplitude of said first electrical signal, the improvement comprising means for producing a second electrical signal having a frequency in respect to time substantially in phase with the varying frequency of said generated useful seismic waves, a time delay unit for time delaying said second electrical signal, a filter unit electrically connected between said measuring means and said receiving means for filtering the noise from said first signal in order to separate the portion of said first signal representing the useful seismic wave and pass such portion to said measuring means, said filter unit and said time delay unit being electrically connected whereby the time delay of said second time delayed signal controls the band of frequencies passed by said filter unit, and means for determining the instantaneous time delay of said second time delayed signal in order to correlate said time delay with the instantaneous amplitude of the signal passed by said filter and measured by said measuring means.

11. In apparatus for geophysical prospecting which comprises means for generating in the earth a seismic wave of cyclically varying frequency, receiving means for receiving at a second point near the surface of the earth the useful wave reflected from the reflecting layers beneath the surface of the earth and the noise accompanying said waves, said receiving means being adapted for transforming said waves and noise into a first electrical signal, and means for measuring the amplitude of said first signal, the improvement comprising means for producing a second electrical signal having a frequency in respect to time substantially in phase with the varying frequency of said generated useful seismic waves, a time delay unit for time delaying said second electrical signal, a filter unit electrically connected between said receiving means and said measuring means for filtering the noise from said first signal in order to separate the portion of the signal representing the useful seismic wave and pass such portion to said measuring means, said filter unit and said time delay unit being electrically connected whereby the time delay of said second time delayed signal controls the band of frequencies passed by said filter unit, and means for determining the instantaneous time delay of said second time delayed signal in order to correlate said time delay with the instantaneous amplitude of the signal passed by said filter and measured by said measuring means.

12. Apparatus for determining the travel time of seismic waves through formations traversed by a borehole comprising means for generating in the earth adjacent said borehole seismic waves of cyclically varying frequency, a geophone for receiving said seismic waves and noise accompanying said wave and for transforming said seismic waves and noise into a first electrical signal, means for raising and lowering said geophone in said borehole, measuring means for measuring the amplitude of said first signal, the improvement comprising means for producing a second electrical signal having a frequency in respect to time substantially in phase with the varying frequency of said generated useful seismic waves, a time delay unit for time delaying said second electrical signal, a filter unit electrically connected between said geophone and said measuring means for filtering the noise from said first signal in order to separate the portion of the signal representing the useful seismic wave and pass such portion to said measuring means, said filter unit and said time delay unit being electrically connected whereby the time delay of said second time delayed signal controls the band of frequencies passed by said filter unit, and means for determining the instantaneous time delay of said second time delayed signal in order to correlate said time delay with the instantaneous amplitude of the signal passed by said filter and measured by said measuring means.

13. Apparatus for determining the travel time of seismic waves through formations traversed by a borehole comprising means for generating in the earth adjacent said borehole seismic waves of cyclically varying frequency, a geophone for receiving said seismic waves and noise accompanying said wave and for transforming said seismic waves into a first electrical signal, means for raising and lowering said geophone in said borehole, means for measuring the amplitude of said first signal, the improvement comprising means for producing a second electrical signal having a frequency in respect to time substantially in phase with the varying frequency of said generated useful seismic waves, a time delay unit for time delaying said electrical signal, a filter unit electrically connected between said geophone and said measuring means for filtering said first signal in order to pass that portion of the signal representing the useful seismic wave, means for varying the time delay of said second time delayed signal, said filter unit and said time delay unit being electrically connected whereby the time delay of said second time delayed signal controls the band of frequencies passed by said filter unit, said measuring means and said means for varying the time delay being electrically interconnected to form a feedback circuit whereby the signal passed by said filter controls the time delay of time delayed second signal and the time delayed second signal controls the filter unit, and means for recording the time delay of said delayed signal with relation to the depth of said geophone in said borehole.

14. In apparatus for obtaining geophysical measurements comprising a generator for generating in the earth useful seismic waves of cyclically varying frequency, receiving means located at a place remote from the source of said generated waves for receiving said useful waves and the noise accompanying said waves and for transforming said useful waves and noise into a first electrical signal, and measuring means for measuring the amplitude of said first electrical signal, the improvement comprising means for producing a second electrical signal having a frequency in respect to time substantially in phase with the varying frequency of said generated useful seismic waves, a time delay unit for time delaying said second electrical signal, a converter electrically connected between said receiver and said measuring means for converting that portion of the first signal representative of the useful waves received by said receiver into a low frequency signal, a low pass narrow band filter electrically connected between said converter and said measuring means, said converter and said time delay unit being electrically connected so that the time delayed second signal controls the frequency of the signal rectified by said converter, said low pass narrow band filter being tuned to the frequency of the rectified signal produced by the converter when the time delay of the second time delayed signal is equal to the travel time of the useful seismic wave from said generator to said receiving means, and means for determining the instantaneous time delay of said second time delayed signal in order to correlate said time delay with the instantaneous amplitude of the signal passed by said filter and measured by said measuring means.

15. The apparatus described in claim 14 in which the converter comprises a synchronous relay whose frequency of operation is controlled by the frequency of said time delayed signal.

16. In apparatus for geophysical prospecting which comprises means for generating in the earth a seismic wave of cyclically varying frequency, receiving means for receiving at a second point near the surface of the earth the useful wave reflected from the reflecting layers beneath the surface of the earth and the noise accompanying said waves, said receiving means being adapted for transforming said waves and noise into a first electrical signal, and means for measuring the amplitude of said first signal, the improvement comprising means for producing a second electrical signal having a frequency in respect to time substantially in phase with the varying frequency of said generated useful seismic waves, a time delay unit for time delaying said second electrical signal, a converter electrically connected between said receiver and said measuring means for converting that portion of the first signal representative of the useful waves received by said receiver into a low frequency signal, a low pass narrow band filter electrically connected between said converter and said measuring means, said converter and said time delay unit being electrically connected so that the time delayed second signal controls the frequency of the signal rectified by said converter, said low pass narrow band filter being tuned to the frequency of the rectified signal produced by the converter when the time delay of the second time delayed signal is equal to the travel time of the useful seismic wave from said generator to said receiving means, and means for determining the instantaneous time delay of said second time delayed signal in order to correlate said time delay with the instantaneous amplitude of the signal passed by said filter and measured by said measuring means.

17. Apparatus for determining the travel time of seismic waves through formations traversed by a borehole comprising means for generating in the earth adjacent said borehole seismic waves of cyclically varying frequency, a geophone for receiving said seismic waves and noise accompanying said wave and for transforming said seismic waves and noise into a first electrical signal, means for raising and lowering said geophone in said borehole, measuring means for measuring the amplitude of said first signal, the improvement comprising means for producing a second electrical signal having a frequency in respect to time substantially in phase with the varying frequency of said generated useful seismic waves, a time delay unit for time delaying said second electrical signal, a converter electrically connected between said receiver and said measuring means for converting that portion of the first signal representative of the useful waves received by said receiver into a low frequency signal, a low pass narrow band filter electrically connected between said converter and said measuring means, said converter and said time delay unit being electrically connected so that the time delayed second signal controls the frequency of the signal rectified by said converter, said low pass narrow band filter being tuned to the frequency of the rectified signal produced by the converter when the time delay of the second time delayed signal is equal to the travel time of the useful seismic wave from said generator to said receiving means, and means for determining the instantaneous time delay of said second time delayed signal in order to correlate said time delay with the instantaneous amplitude of the signal passed by said filter and measured by said measuring means.

References Cited in the file of this patent
UNITED STATES PATENTS

| | | |
|---|---|---|
| 2,275,735 | Cloud | Mar. 10, 1942 |
| 2,275,736 | Cloud | Mar. 10, 1942 |
| 2,355,826 | Sharpe | Aug. 15, 1944 |
| 2,364,209 | Green | Dec. 5, 1944 |
| 2,521,130 | Scherbatskoy | Sept. 5, 1950 |
| 2,688,124 | Doty et al. | Aug. 31, 1954 |